United States Patent
Drepper

(10) Patent No.: US 8,612,970 B2
(45) Date of Patent: Dec. 17, 2013

(54) PURPOSE DOMAIN FOR LOW OVERHEAD VIRTUAL MACHINES

(75) Inventor: Ulrich Drepper, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 1470 days.

(21) Appl. No.: 11/289,402

(22) Filed: Nov. 30, 2005

(65) Prior Publication Data
US 2007/0169005 A1    Jul. 19, 2007

(51) Int. Cl.
| G06F 9/455 | (2006.01) |
| G06F 9/44 | (2006.01) |
| G06F 9/45 | (2006.01) |
| G06F 9/46 | (2006.01) |
| G06F 3/00 | (2006.01) |
| G06F 13/00 | (2006.01) |

(52) U.S. Cl.
USPC ............ 718/1; 718/100; 718/102; 717/118; 717/140; 717/148; 717/136; 719/310; 719/319

(58) Field of Classification Search
USPC ............ 718/1, 107; 719/319, 310; 717/118, 717/148, 154, 136, 140
See application file for complete search history.

(56) References Cited

U.S. PATENT DOCUMENTS

| 5,815,415 | A | * | 9/1998 | Bentley et al. ............... 703/4 |
| 5,987,523 | A | * | 11/1999 | Hind et al. ................... 709/245 |
| 6,021,469 | A | * | 2/2000 | Tremblay et al. ............ 711/125 |
| 6,075,938 | A |   | 6/2000 | Bugnion et al. |
| 6,226,665 | B1 | * | 5/2001 | Deo et al. .................... 718/106 |
| 6,321,377 | B1 | * | 11/2001 | Beadle et al. ................ 717/148 |
| 6,324,685 | B1 | * | 11/2001 | Balassanian ................. 717/118 |
| 6,397,242 | B1 | * | 5/2002 | Devine et al. ................ 718/1 |
| 6,510,352 | B1 | * | 1/2003 | Badavas et al. .............. 700/19 |
| 6,513,158 | B1 | * | 1/2003 | Yogaratnam ................. 717/166 |
| 6,571,274 | B1 |   | 5/2003 | Jacobs et al. |
| 6,675,230 | B1 | * | 1/2004 | Lewallen .................... 719/328 |
| 6,751,274 | B2 | * | 6/2004 | Kim et al. .................... 375/346 |
| 6,854,123 | B1 | * | 2/2005 | Lewallen .................... 719/328 |
| 6,934,761 | B1 |   | 8/2005 | Curtis |

(Continued)

OTHER PUBLICATIONS

"Virtual machine monitors: current technology and future trends" by Rosenblum, M.; Garfinkel, T.; IEEE Journal, vol. 38, Issue 5, May 2005 pp. 39-47.*

(Continued)

*Primary Examiner* — Emerson Puente
*Assistant Examiner* — Charles Swift
(74) *Attorney, Agent, or Firm* — Lowenstein Sandler LLP

(57) ABSTRACT

Embodiments of the present invention provide an architecture for securely and efficiently executing byte code generated from a general programming language. In particular, a computer system is divided into a hierarchy comprising multiple types of virtual machines. A thin layer of software, known as a virtual machine monitor, virtualizes the hardware of the computer system and emulates the hardware of the computer system to form a first type of virtual machine. This first type of virtual machine implements a virtual operating domain that allows running its own operating system. Within a virtual operating domain, a byte code interpreter may further implement a second type of virtual machine that executes byte code generated from a program written in a general purpose programming language. The byte code interpreter is incorporated into the operating system running in the virtual operating domain. In addition, an operating system running in a virtual operating domain may be configured as a special purpose operating system that is optimized for the functions of a particular byte code interpreter.

17 Claims, 4 Drawing Sheets

(56) References Cited

U.S. PATENT DOCUMENTS

| | | | |
|---|---|---|---|
| 6,957,439 B1* | 10/2005 | Lewallen | 719/328 |
| 6,961,941 B1* | 11/2005 | Nelson et al. | 719/319 |
| 7,020,738 B2* | 3/2006 | Neiger et al. | 711/6 |
| 7,035,963 B2* | 4/2006 | Neiger et al. | 711/6 |
| 7,039,904 B2 | 5/2006 | Sokolov | |
| 7,401,230 B2* | 7/2008 | Campbell et al. | 713/190 |
| 7,409,487 B1 | 8/2008 | Chen et al. | |
| 7,478,373 B2* | 1/2009 | Bond et al. | 717/138 |
| 7,480,908 B1 | 1/2009 | Tene et al. | |
| 7,908,653 B2* | 3/2011 | Brickell et al. | 726/22 |
| 2002/0099863 A1* | 7/2002 | Comeau et al. | 709/310 |
| 2002/0122055 A1 | 9/2002 | Parupudi et al. | |
| 2002/0143842 A1* | 10/2002 | Cota-Robles et al. | 709/1 |
| 2002/0161909 A1 | 10/2002 | White | |
| 2003/0097360 A1* | 5/2003 | McGuire et al. | 707/8 |
| 2003/0126187 A1* | 7/2003 | Won et al. | 709/107 |
| 2003/0135509 A1 | 7/2003 | Davis et al. | |
| 2003/0149966 A1* | 8/2003 | McGuire | 717/148 |
| 2003/0149967 A1* | 8/2003 | Kamada et al. | 717/148 |
| 2003/0163711 A1* | 8/2003 | Grawrock | 713/189 |
| 2003/0204838 A1 | 10/2003 | Caspole et al. | |
| 2004/0064819 A1 | 4/2004 | LaVoie et al. | |
| 2004/0158830 A1* | 8/2004 | Chung et al. | 718/1 |
| 2004/0216096 A1* | 10/2004 | Messer et al. | 717/154 |
| 2005/0188382 A1* | 8/2005 | Nagendra et al. | 719/328 |
| 2005/0262138 A1* | 11/2005 | Hartel et al. | 707/103 R |
| 2006/0005189 A1* | 1/2006 | Vega et al. | 718/1 |
| 2006/0064545 A1* | 3/2006 | Wintergerst | 711/130 |
| 2006/0259292 A1 | 11/2006 | Solomon et al. | |
| 2007/0083862 A1 | 4/2007 | Wooldridge et al. | |
| 2009/0172665 A1* | 7/2009 | Tene et al. | 718/1 |

OTHER PUBLICATIONS

"Rethinking the Design of Virtual Machine Monitors" by Andrew Whitaker et al, IEEE Journal, May 2005, p. 57-62.*

Engler et al, "Exokernel: An Operating System Architecture for Application-Level Resource Management", 1995, ACM, pp. 251-266.*

Whitaker et al, "Scale and Performance in the Denali Isolation Kernel", 2002, ACM, pp. 195-209.*

Back et al, "The KaffeOS Java Runtime System", Jul. 2005, ACM, pp. 583-630.*

Whitaker et al, "Denali: a scalable isolation kernel", 2002, ACM, pp. 10-15.*

Thekkath et al, "Hardware and Software Support for Efficient Exception Handling", 1994, ACM, pp. 110-119.*

Erlingsson et al, "Virtual Environment for Unreliable Extensions", Jun. 2005, pp. 1-10 with cover page.*

Mitchem et al., Using Kernel Hypervisors to Secure Applications. In Proceedings of the 13th Annual Computer Security Applications Conference, Dec. 1997, IEEE Computer Society, p. 175-181.

Santhanam, Towards Linux 2.6, IBM developerWorks, Sep. 23, 2003, pp. 1-19.

KVM: Kernel-based Virtualization Driver, White Paper, Qumranet, 2006, retrieved Feb. 17, 2010 from <http://web.archive.org/web/20070108015503/www.qumranet.com/wp/kvm_wp.pdf>, pp. 1-5.

KVM—Kernel Based Virtual Machine, Red Hat, 2009, retrieved Feb. 17, 2010 from <http://www.redhat.com/f/pdf/rhev/DOC-KVM.pdf>, pp. 1-11.

Red Hat Notice of Allowance for U.S. Appl. No. 11/289,406 Mailed Sep. 19, 2011.

Red Hat Final Office Action for U.S. Appl. No. 11/289,406 Mailed Mar. 16, 2011.

Red Hat Non-Final Office Action for U.S. Appl. No. 11/289,406 Mailed Oct. 1, 2010.

Red Hat Final Office Action for U.S. Appl. No. 11/289,406 Mailed Mar. 16, 2010.

Red Hat Advisory Action for U.S. Appl. No. 11/289,402 Mailed Jul. 12, 2010.

USPTO, Office Action for U.S. Appl. No. 11/289,401 mailed Jun. 22, 2009.

USPTO, Office Action for U.S. Appl. No. 11/289,401 mailed Mar. 23, 2010.

USPTO, Office Action for U.S. Appl. No. 11/289,401 mailed Oct. 12, 2010.

USPTO, Final Office Action for U.S. Appl. No. 11/289,401 mailed Mar. 11, 2011.

USPTO, Office Action for U.S. Appl. No. 11/289,401 mailed Jul. 20, 2011.

USPTO, Final Office Action for U.S. Appl. No. 11/289,401 mailed Dec. 5, 2011.

* cited by examiner

PURPOSE DOMAIN FOR LOW OVERHEAD VIRTUAL MACHINES

CROSS REFERENCE TO RELATED APPLICATIONS

The following copending and commonly assigned U.S. patent applications are relied upon and are incorporated by reference in this application: U.S. patent application Ser. No. 11/289,401, entitled "IN-KERNEL VIRTUAL MACHINE FOR LOW OVERHEAD STARTUP AND LOW RESOURCE USAGE," filed Nov. 30, 2005; and U.S. patent application Ser. No. 11/289,406, entitled "PURPOSE DOMAIN FOR IN-KERNEL VIRTUAL MACHINE FOR LOW OVERHEAD STARTUP AND LOW RESOURCE USAGE," filed Nov. 30, 2005.

FIELD OF THE INVENTION

The present invention relates generally to applications consisting of byte code generated from a general purpose programming languages and executed by byte code interpreters. In particular, embodiments of the present invention provide a purpose domain for a virtual machine implemented by a byte code interpreter.

BACKGROUND OF THE INVENTION

Today, there are many applications that are written in general purpose programming languages. A desired characteristic of these applications is platform independence. That is, an application can be written once and executed on multiple computer platforms. Platform independence for an application written in a general purpose programming language is achieved by compiling the language code into byte code. A special program, known as a byte code interpreter, runs on the host computer system. The byte code interpreter implements a virtual machine on which the byte code is interpreted. Alternatively, the byte code can be translated into usable native code that can be executed by the host computer system. Standardized libraries may also be installed on a host computer system to provide access to features, such as graphics and networking.

General purpose programming languages have been in use for a while and have int the last years become popular for Internet applications, such as web applications and browsing. For example, languages, such as Java, have become very successful with server-side applications, such as web services, or servlets.

Unfortunately, applications written in general purpose programming languages often suffer from certain disadvantages. For example, applications written in a native language, such as C or C++, can typically run faster on a computer system than an application written in general purpose programming language. However, programs available in byte code form can sometimes be more secure because the byte code interpreter can perform additional tests that can prevent invalid use during the execution of the byte code.

Additionally, it may be desirable to provide systems and methods that can efficiently run applications available in byte code form that are independent of platform specifics of the computer.

SUMMARY OF THE INVENTION

In accordance with one feature of the invention, a computer comprises a processor, a virtual machine monitor, and an operating system. The virtual machine monitor is coupled to the processor and provides support to create a set of virtual operating domains. The operating system is encapsulated within one of the virtual operating domains and is coupled to the processor through the virtual machine monitor. In addition, the operating system is configured to interpret byte code generated for a general purpose programming language.

In accordance with another feature of the invention, a method of starting an applet on a computer is provided. The hardware of the computer is accessed through a virtual machine monitor and the virtual machine monitor is configured to create virtual operating domains on demand. When a request to start an applet is received, the virtual machine monitor is instructed to create a virtual operating domain for the applet. An operating system that comprises a byte code interpreter for a general purpose programming language is loaded into the virtual operating domain for the applet. The applet can then be started in the virtual operating domain.

In accordance with another feature of the invention, a method of executing a loaded applet on a computer in a virtual operating domain is provided. When a request by the applet is received through services of the virtual operating domain, the request may be serviced by a byte code interpreter that is directly accessing services of the virtual operating domain. A result for the request by the applet is then sent through the services of the virtual operating domain. follows, and in part will be obvious from the description, or may be learned by practice of the invention. The features of the invention will be realized and attained by means of the elements and combinations particularly pointed out in the appended claims.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodiments of the invention and together with the description, serve to explain the principles of the invention.

DESCRIPTION OF THE EMBODIMENTS

Embodiments of the present invention provide an architecture for securely and efficiently executing byte code generated from a general programming language. In particular, a computer system is divided into a hierarchy comprising multiple virtual machines. A thin layer of software, known as a virtual machine monitor, virtualizes the hardware of the computer system and emulates the hardware of the computer system to form a first type of virtual machine. Instances of this first type of virtual machine are here referred to as a virtual operating domain and they run each their own operating system. Within a virtual operating domain, a byte code interpreter may further implement a second type of virtual machine that executes byte code generated from a general purpose programming language.

In some embodiments, the byte code interpreter is incorporated into the operating system running in the virtual operating domain. In addition, an operating system running in a virtual operating domain may be configured as a special purpose operating system that is optimized for the functions of a particular byte code interpreter.

Accordingly, the virtual machine can run efficiently with low overhead if the applet and the kernel run in the same address space of virtual memory. This architecture may be advantageous over conventional technology, for example, because it uses a function call rather than a system call to access the operating system functionality. System calls have a higher overhead. In addition, because the execution happens in a separate and dedicated virtual operating domain, security of the rest of the system is not compromised by removing the separation between kernel and application.

Reference will now be made in detail to exemplary embodiments of the invention, which are illustrated in the accompanying drawings. Wherever possible, the same reference numbers will be used throughout the drawings to refer to the same or like parts.

Figure 1:
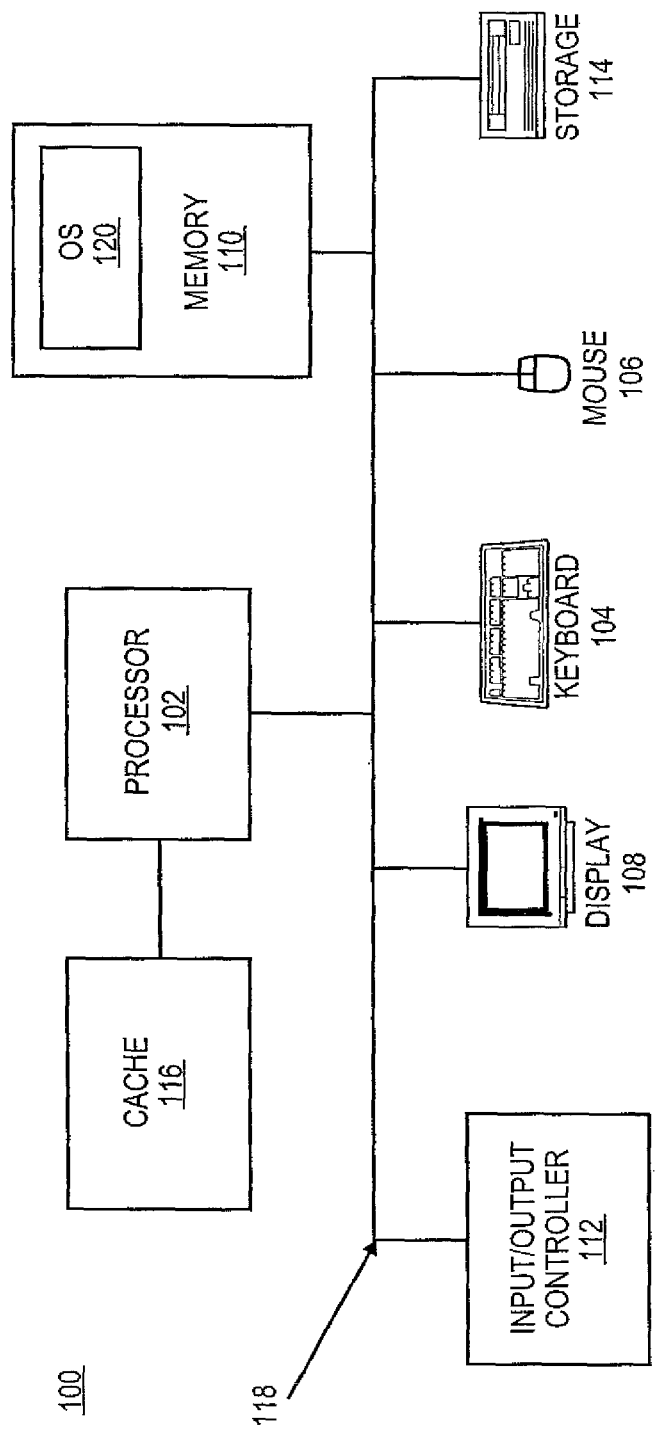
FIG. 1 illustrates a computer system that is consistent with embodiments of the present invention.

FIG. 1 illustrates a computer system 100 that is consistent with embodiments of the present invention. In general, embodiments of the present invention may be implemented in various computer systems, such as a personal computer, server, workstation, and the like. However, for purposes of explanation, system 100 is shown as a general purpose computer that is well known to those skilled in the art. Examples of the components that may be included in system 100 will now be described.

As shown, computer system 100 may include a central processor 102, a keyboard 104, a pointing device 106 (e.g., mouse, or the like), a display 108, a main memory 110, an input/output controller 112, and a storage device 114. Processor 102 may further include a cache memory 116 for storing frequently accessed information. Cache 116 may be an "on-chip" cache or external cache. System 100 may also be provided with additional input/output devices, such as a printer (not shown). The various components of the system 100 communicate through a system bus 118 or similar architecture.

Figure 2:
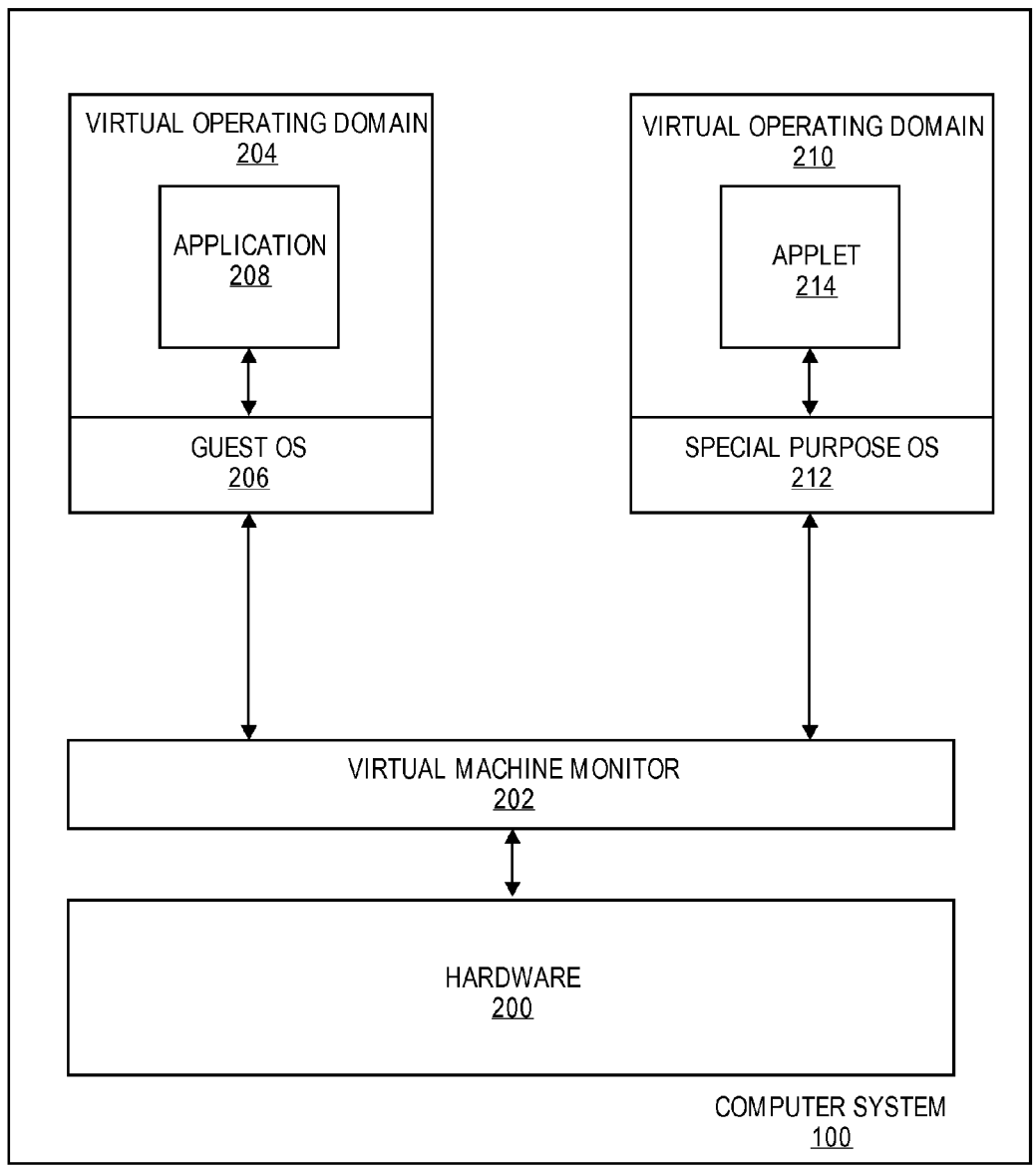
FIG. 2 illustrates a software architecture of the computer system that is in accordance with embodiments of the present invention.

FIG. 2 illustrates a software architecture of computer system 100 that is in accordance with embodiments of the present invention. As shown, system 100 may comprise hardware 200, a virtual machine monitor 202, and virtual operating domains 204 and 206.

Hardware 200 represents the components of hardware and firmware described above with reference to FIG. 1, such as processor 102 and memory 110. Such hardware and firmware are well known to those skilled in the art.

Virtual machine monitor 202 is a layer of software that runs directly on hardware 200 of computer system 100. In the embodiment shown in FIG. 2, virtual machine monitor 202 runs directly on hardware 200 in the most privileged mode offered by processor 102. Essentially, virtual machine monitor 202 is a small operating system. In some embodiments, virtual machine monitor 202 may be implemented using known software, such as Xen.

Virtual machine monitor 202 logically partitions hardware 200 into one or more virtual operating domains (or virtual machines) and an operating system (known as a "guest operating system") executes within each virtual operating domain. In order to provide virtual partitioning of hardware 200, virtual machine monitor 202 provides management of memory 110, virtualizes processor 102, and can manage I/O from and to devices, such as display 108, keyboard 104, storage 114, and the like.

In general, virtual machine monitor 202 may support any number of virtual operating domains and interface with a variety of known operating systems. Well known examples of operating systems that are consistent with the principles of the present invention include LINUX, MAC OS by APPLE INC., SOLARIS by SUN MICROSYSTEMS, WINDOWS by MICROSOFT CORPORATION, and the like.

For example, in FIG. 2, a virtual operating domain 204 is shown in which a guest OS 206, such as LINUX, MAC OS, SOLARIS, or WINDOWS, can execute. Guest OS 206 may provide support for the execution of an application 208. Common examples for application are well known to those skilled in the art. For example, various user applications, such as a web browser, word processor, etc., may be implemented by embodiments of the present invention.

In addition, virtual machine monitor 202 may also provide a virtual operating domain that is a special purpose operating domain for byte code interpreted applications, such as Java or C# applets. In FIG. 2, virtual operating domain 210 is provided to serve as one example of a special purpose operating domain and will now be further described.

Virtual operating domain 210 is created by virtual machine monitor 202 and provides an execution environment in which a user can efficiently run byte code interpreted applications. Special purpose OS 212 executes inside of virtual operating domain 210 and any number of applications may run on top of special purpose OS 212. In some embodiments, special purpose OS 212 supports the running of one applet. By running inside its own virtual operating domain 210, special purpose OS 212 is provided a platform independent interface to hardware 200 via virtual machine monitor 202. In addition, when multiple Java applications or applets are running, each may be allocated a separate virtual operating domain to isolate them from each other and from the other guest operating systems.

Special purpose OS 212 may be predominantly software, but may also comprise partial or complete hardware implementations and firmware. Although FIG. 2 depicts a single virtual operating domain, one skilled in the art will recognize that system 100 may implement any number of virtual operating domains.

In some embodiments, special purpose OS 212 is configured to optimally support the execution of applications written in a general purpose language that is translated into byte code rather than into machine code. For example, special purpose OS 212 may be configured to run applications or applets written in Java or C#. Since it is specifically designed for this purpose, special purpose OS 212 may be streamlined to include only those functions needed to support the byte code interpreter and the runtime of the programming language. In addition, in some embodiments, special purpose OS 212 incorporates a byte code interpreter within its kernel space in order to enhance its efficiency and speed. Alternatively, special purpose OS 212 may support an applet without a distinction between user level and kernel level spaces. Other aspects of special purpose OS 212 may differ from typical general purpose operating systems, such as LINUX and WINDOWS by MICROSOFT. Special purpose OS 212 is further described with reference to FIG. 3.

Applet 214 is a software component that runs on top of special purpose OS 212. In general, applet 214 may run inside the context of another program, for example a web browser, or through a plugin, or a variety of other applications that support an applet programming model. Of course, one skilled in the art will recognize that special purpose OS 212 may support running any type of raw applet.

Applet 214 may usually have some form of user interface or perform a particular piece of the overall user interface, such as in a web page. Common examples for applets 208 are Java applets, C# applets, and flash movies, and the like.

Figure 3:
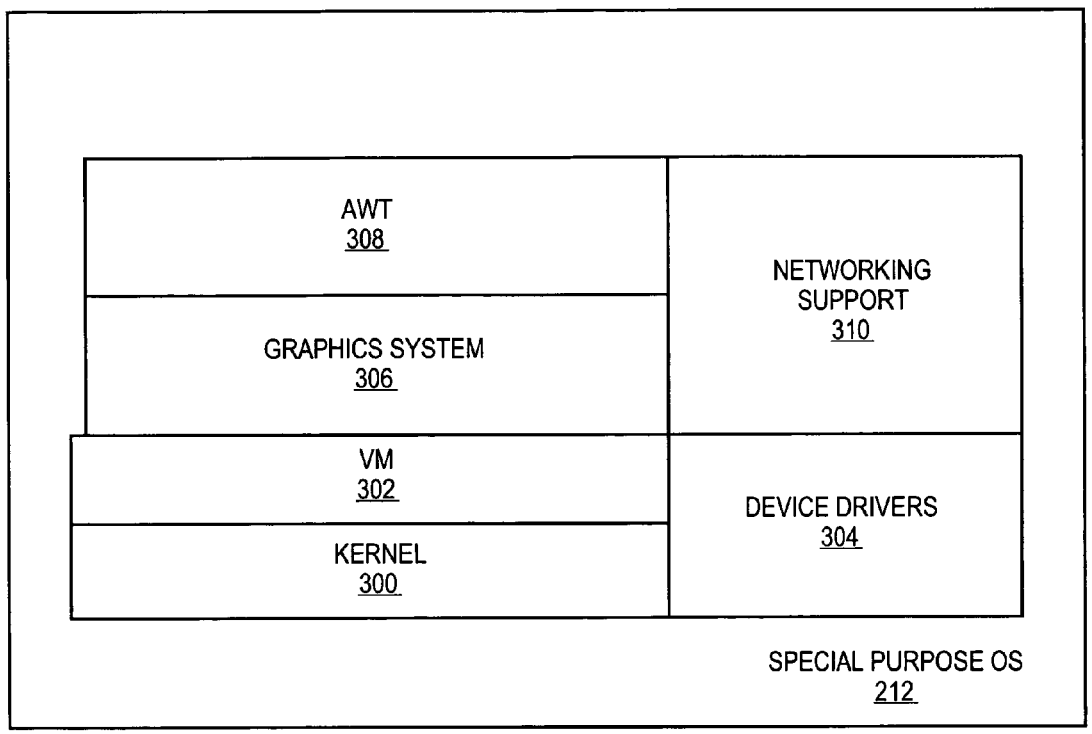
FIG. 3 illustrates an exemplary architecture of a special purpose OS that is in accordance with embodiments of the present invention.

FIG. 3 illustrates an exemplary architecture of special purpose OS 212 that is in accordance with embodiments of the present invention. As noted, special purpose OS 212 may be streamlined in various ways to optimally support byte code interpreted applications, such as applet 214. One example of a streamlined architecture for special purpose OS 212 will now be described.

Kernel 300 serves as the core of special purpose OS 212 and provides access to hardware 200 via virtual machine monitor 202. In some embodiments, kernel 300 is implemented as a streamlined or partial kernel. Kernel 300 may be streamlined to provide a very simple abstraction comprising a small set of primitives or system calls that implement low level services, such as thread management, address space management, direct memory access, and interprocess communication. As noted above, kernel 300 accesses hardware 200 through a platform independent interface provided by virtual machine monitor 202. Thus, kernel 300 may operate with virtually any platform by relying on the interface provided by virtual machine monitor 202.

In addition, kernel 300 may implement a virtual machine of the second type 302 its address space. Virtual machine 302 runs on top of kernel and its primary function is to interpret and execute byte code generated from a program written in a general purpose language, such as Java or C#. For example, virtual machine 302 may be implemented as a Java Virtual Machine or C# virtual machine, which are well known to those skilled in the art.

As also shown, special purpose OS 212 may include other components that are tailored for a particular environment. Each of these components are functionally independent of each other and may be added or omitted depending on the needs of the intended environment. For example, if computer system 100 performed a substantial amount of operations with a network, such as the Internet, then special purpose OS 212 may include a fuller set of components. However, if computer system 100 were a more limited device or performed only limited tasks, then special purpose OS 212 may appropriately include fewer components. Some of the components that are likely to be found in special purpose OS 212 will now be described.

Device drivers 304 are used to enable communications between special purpose OS 212 and hardware 200, such as display 108, and keyboard 104. In some embodiments, device drivers 304 leverage the platform independent interface provided by virtual machine monitor 206 and, thus, are implemented as virtual device drivers. This includes device drivers that require the capability to directly address specify addresses in memory 110 and to handle device interrupts.

Graphics system 306 provides basic graphics functions required to manage display 108 and provides a foundation for the Abstract Windowing Toolkit (AWT). AWT 308 provide applet 212 a wide range of graphics capabilities including an ability to draw geometric objects, render fonts, and control and display cursors on display 108.

Networking module 310 provides support for network communications. For example, networking module 310 may provide support for transport control protocol (TCP), user datagram protocol (UDP), or higher-level protocols like network information service, network file system, domain name service, and simple network management protocol.

Figure 4:
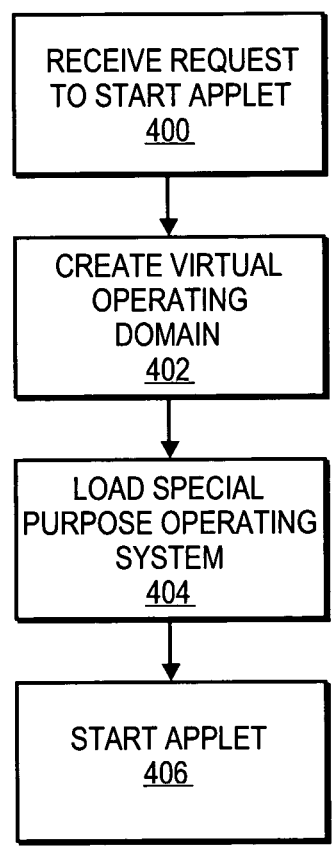
FIG. 4 illustrates an exemplary process flow for starting an applet on the computer system that is in accordance with embodiments of the present invention.

FIG. 4 illustrates a process flow for starting an applet on computer system 100. In stage 400, system 100 receives a request to start an applet, such as a Java or C# applet. Accordingly, application 208 may pass this request to guest OS 206. Processing may then flow to stage 402.

In stage 402, guest OS 206 passes the request for a new applet to virtual machine monitor 202 and instructs it to create another virtual operating domain. In particular, virtual machine monitor 202 may create virtual operating domain 210. Processing may then flow to stage 404.

In stage 404, virtual machine monitor 202 determines that the request is for an applet and, thus, loads special purpose OS 212 into virtual operating domain 210. Subsequently, special purpose OS 212 may perform its startup sequence. Subsequently, the applet, such as applet 214, itself may then be loaded. In stage 406, special purpose OS 212 may then start an applet, such as applet 214, in virtual operating domain 210. Applet 214 may then perform its operations. Processing may then conclude or repeat again at stage 400 if another applet is requested. One skilled in the art will also recognize that the process described with reference to FIG. 4 not only applies to applets, but may also apply to applications, such as Java applications and C# applications.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer comprising:
   a memory;
   a processor communicably coupled to the memory; and
   a virtual machine monitor communicably coupled to the memory and the processor, the virtual machine monitor to:
   virtualize the memory and the processor for a set of virtual domains provided by the virtual machine monitor;
   receive a request to start an applet from a first virtual domain of the set of virtual domains;
   create a second virtual domain to start and execute the applet in response to the received request; and
   incorporate a byte code interpreter in address space of a kernel of an operating system of the second virtual domain, the operating system of the second virtual domain to run byte code interpreted applications comprising at least the applet using the byte code interpreter, wherein the kernel to access hardware of the computer through a platform independent interface provided by the virtual machine monitor.

2. The computer of claim 1, wherein the operating system of the second virtual domain comprises a Java Virtual Machine that is to interpret Java byte code.

3. The computer of claim 1, wherein the operating system of the second virtual domain comprises a virtual machine that is to interpret C# byte code.

4. The computer of claim 1, wherein the virtual machine monitor is to concurrently support a third virtual domain of the set of virtual domains to execute a second applet.

5. The computer of claim 1, wherein the operating system of the second virtual domain is to provide only functions requested for supporting the applet.

6. A method comprising:
   receiving, by a virtual machine monitor of a computing device, a request from an applet that is executing in a first virtual domain of a set of virtual domains provided by the virtual machine monitor, wherein execution of the applet was requested by a second virtual domain of the set of virtual domains but directed by the virtual machine monitor to be executed by the first virtual domain;
   servicing, by the virtual machine monitor, the request from the applet; and sending, by the virtual machine monitor, a result of the request to the applet;

wherein the first virtual domain comprises a byte code interpreter in address space of a kernel of a special-purpose operating system of the first virtual domain, the special-purpose operating system of the first virtual domain to run byte code interpreted applications comprising at least the applet using the byte code interpreter, wherein the kernel to access hardware of the computer through a platform independent interface provided by the virtual machine monitor.

7. The method of claim 6, wherein receiving the request further comprises receiving a request to start a Java applet.

8. The method of claim 6, wherein receiving the request further comprises receiving a request to start a C# applet.

9. The method of claim 6, wherein the request is serviced by directly accessing hardware of the computing device.

10. The method of claim 6, wherein the request is serviced by using a virtual device driver of the virtual machine monitor to communicate with the second virtual domain on the computer.

11. The method of claim 6, wherein the first virtual domain is a special purpose virtual domain having access to hardware of the computing device through the virtual machine monitor.

12. A method comprising:

receiving, by a virtual machine monitor of a computing device, a request to start an applet from a first virtual domain of a set of virtual domains provided by the virtual machine monitor;

creating, by the virtual machine monitor, a second virtual domain for running the applet;

incorporate a byte code interpreter in address space of a kernel of an operating system of the second virtual domain, the operating system of the second virtual domain, to run byte code interpreted applications comprising at least the applet using the byte code interpreter, wherein the kernel to access hardware of the computer through a platform independent interface provided by the virtual machine monitor; and starting, by the virtual machine monitor, the applet in the second virtual domain, wherein the applet runs in the operating system of the second virtual domain.

13. The method of claim 12, wherein receiving the request to start the applet comprises receiving a request to start a Java applet.

14. The method of claim 12, wherein receiving the request to start the applet comprises receiving a request to start a C# applet.

15. The method of claim 12, wherein the operating system is a special purpose operating system that is to provide only functions requested for executing the applet.

16. The method of claim 12, wherein the byte code interpreter is a Java byte code interpreter.

17. The method of claim 12, wherein the byte code interpreter is a C# byte code interpreter.

* * * * *